(12) United States Patent
Pine

(10) Patent No.: US 6,946,635 B1
(45) Date of Patent: Sep. 20, 2005

(54) SYSTEM FOR IMPROVING THE DYNAMIC RANGE OF SOLID-STATE IMAGING DEVICES

(75) Inventor: Joshua I. Pine, Seal Beach, CA (US)

(73) Assignee: ESS Technology, Inc., Fremont, CA (US)

( * ) Notice: Subject to any disclaimer, the term of this patent is extended or adjusted under 35 U.S.C. 154(b) by 1023 days.

(21) Appl. No.: 09/679,857

(22) Filed: Oct. 5, 2000

(51) Int. Cl.[7] .............................................. H01L 27/00
(52) U.S. Cl. .................... 250/208.1; 348/297
(58) Field of Search ........................... 250/208.1, 204, 250/205, 578.1; 348/222.1, 229.1, 297, 364; 356/222; 358/483

(56) References Cited

U.S. PATENT DOCUMENTS

| | | | |
|---|---|---|---|
| 3,988,619 A | 10/1976 | Malaviya et al. | |
| 4,302,764 A | 11/1981 | Fang et al. | |
| 4,335,450 A | 6/1982 | Thomas | |
| 4,612,578 A | 9/1986 | Breithaupt | |
| 5,233,428 A * | 8/1993 | Alford et al. | 348/230.1 |
| 5,541,402 A | 7/1996 | Ackland et al. | |
| 5,929,908 A * | 7/1999 | Takahashi et al. | 348/364 |
| 6,011,251 A | 1/2000 | Dierickx et al. | |
| 6,040,858 A | 3/2000 | Ikeda | |
| 6,049,100 A | 4/2000 | Kawai et al. | |
| 6,069,377 A | 5/2000 | Prentice et al. | |
| 6,081,294 A * | 6/2000 | Cooper | 348/221.1 |

* cited by examiner

*Primary Examiner*—David Porta
*Assistant Examiner*—Seung C. Sohn
(74) *Attorney, Agent, or Firm*—Farjami & Farjami LLP

(57) ABSTRACT

The disclosure is a solid-state imaging device, including a photosensor for collecting charge created by incident photons, a comparator for comparing a digital voltage value corresponding to the collected charge, to a predetermined value, and generating a comparison output, and a normalizing circuit for normalizing the digital voltage value, in response to the comparison output.

33 Claims, 4 Drawing Sheets

SYSTEM FOR IMPROVING THE DYNAMIC RANGE OF SOLID-STATE IMAGING DEVICES

BACKGROUND OF THE INVENTION

1. Technical Field

This invention relates to a solid-state imaging device with substantially improved dynamic range.

2. Related Art

Solid-state imaging devices (also referred to as image devices or imagers) have broad applications in many areas including commercial, consumer, industrial, medical, defense and scientific fields. Solid-state imaging devices convert a received image from an object into a signal indicative of the received image. Solid-state imaging devices are fabricated from semiconductor materials (such as silicon or gallium arsenide) and include photosensitive imaging arrays (photosensors) of light detecting picture elements, or pixels, (also known as photodetectors) interconnected to generate analog signals representative of the received image. Examples of solid-state imaging devices include charge coupled devices (CCD), photodiode arrays, charge injection devices (CID), hybrid focal plane arrays and complementary metal oxide semiconductor (CMOS) imaging devices.

Photosensors of the solid-state imaging devices are typically formed in an array structure, with rows and columns of photodetectors (such as photodiodes, photoconductors, photocapacitors or photogates) which generate photo-charges proportional to the radiation (such as light) reflected from an object and received by the photosensor. The period of exposure of a photosensor by incident radiation is referred to generally as the integration period. An exposure shutter may control exposure of the photosensor to incident photons. The exposure shutter may be, for example, electrically, mechanically or electro-magnetically operated. The photo-charges are created by photons striking the surface of the solid-state (i.e. semiconductor) material of the photodetectors within the photosensor. As photons strike a photodetector, free charge carriers (i.e., electron-hole pairs) are generated in an amount proportional to the incident photon radiation. The signals from each photodetector may be utilized, for example, to display a corresponding image on a monitor or to provide information about the optical image.

Each photodetector includes a detecting area (also known as the photosensitive area or the detector area) and photodetector circuitry within a common integrated circuit die. The photodetectors receive a portion of the reflected light received at the solid-state imaging device, and collect photo-charges corresponding to the incident radiation intensity falling upon the photodetectors' detecting area of the die. The photo-charges collected by each photodetector are converted to an output analog signal (analog charge signal) or a potential representative of the level of energy reflected from a respective portion of the object. The analog signal (or potential) is then converted to a digital voltage value and processed to create an image.

Solid-state imaging devices are commonly utilized in digital camera devices for both still picture and video applications. In these types of applications, video or still picture quality is related to dynamic range. As result, it is desirable to obtain a digital video or still picture of scenes with a large dynamic range. Despite the differences in CCD, CID and CMOS imager technologies, these technologies typically have the common problem of limited dynamic range. The dynamic range is defined by the maximum number of photons that a photodetector may collect during a period of photon exposure (also referred to as an integration period) without saturating (i.e., exceeding the capacity of) the photodetector, and the minimum number of photons that a photodetector may collect during the integration period that may be detected over the noise floor. More specifically, the dynamic range is defined as the ratio of the effective maximum detectable signal level (often referred to as "saturation") with respect to the root-mean-square (RMS) noise level of the photosensor.

Solid-state imaging devices that generate photo-charges due to incident photons, such as CCD, CID and CMOS imaging devices, have a dynamic range that is limited by the amount of charge that is collected and held in a given photodetector. As an example, if the saturation of a particular photodetector in a solid-state imaging device is 20,000 electrons, and the incident light on that photodetector is so bright that it creates more electrons than may be held in the photodetector (i.e., greater than 20,000 electrons), the excess charge is lost because the excess electrons do not contribute to the signal corresponding to that photodetector. In general, the dynamic range problem is more problematic when the photodetector is an active pixel sensor (APS) cell (i.e., the cell incorporates an active component such as a transistor within the pixel) as compared to a passive pixel sensor (PPS) cell, due to the active components in the APS cells which limit the area available for the detector area, and due to the low voltage supply and clocks utilized in APS cells.

In addition to lost excess charge, excess carriers (i.e., hole-electron pairs) that exceed the amount of charge capable of being stored in the photodetector may cause an undesired blooming phenomenon. Blooming occurs when the excess carriers that exceed the saturation level are locally or partially generated, and those excess carriers flow to other photodetectors. In order to avoid blooming, the exposure time of the image may be decreased. However, when the exposure time is lowered, the photodetectors corresponding to the darker portions of the image collect an insufficient amount of charge to provide meaningful information (i.e., the collected charge may be indistinguishable from noise).

Past attempts at solving the limited dynamic range problem have utilized a non-integrating active pixel sensor cell with a non-linear load device, to obtain a logarithmic response. This approach, however, has a number of disadvantages. First, the noise in a non-integrating cell is much higher than the noise in a conventional integrating cell. Also, the exact non-linear transfer function of this type of device is carefully calibrated to avoid variations from cell to cell and compensate for temperature changes. This increases the complexity and inaccuracy of the device.

Another attempt at solving the problem of limited dynamic range was to increase the resolution of the analog-to-digital converters of the solid-state imaging device. However, the higher the precision of an analog-to-digital converters, the slower it operates. This results in a reduced frame rate for a given number of photodetectors and a given number of analog-to-digital converters. Further, as the resolution of an analog-to-digital converter is increased, the least significant bits begin to fill with system noise (including noise from the conversion circuitry itself) rather than meaningful photodetector magnitude information.

Finally, another attempt at solving the limited dynamic range problem utilized a higher supply voltage for the photodetector circuitry so as to increase the charge capacity of each photodetector. A problem with this approach is that the maximum supply voltage that may be utilized is reduced as semiconductor fabrication processes continue to shrink chip sizes for cost and power advantages.

Thus, a need exists for an improved solid-state imaging device with a substantially increased dynamic range that overcomes the problems and limitations associated with past systems.

SUMMARY

The implementation of a system for improving the dynamic range of solid-state imaging devices may be broadly conceptualized as a solid-state imaging device that comprises an array of photodetectors and additional circuitry that improves dynamic range by accounting for both low illumination and saturation caused by high illumination.

As an example implementation of this system architecture, the solid-state imaging device includes a photosensor for collecting charge created by incident photons, a comparator, and a normalizing circuit. The comparator compares a digital voltage value corresponding to the collected charge, to a predetermined value, and generates a comparison output. The normalizing circuit normalizes the digital voltage value, in response to the comparison output. The solid-state imaging device may also include a memory storage unit that stores normalized voltage values, and a timing control unit that controls the sequencing of photodetectors in the photosensor and the exposure of the photosensor. The invention may also include an indexer for tracking the number of exposure iterations that have occurred.

In another example implementation, the solid-state imaging device performs a method of generating digital images. The method includes collecting a charge in a photodetector by exposing the photosensor with photons, and comparing the charge to a predetermined value. If the charge is greater than or equal to the predetermined value, the method includes storing a digital voltage value corresponding to the charge. If the charge is less than the predetermined value, the method includes collecting additional charge in the photodetector by re-exposing the photodetector. The method of generating digital images may also include non-destructively reading out the charge stored in the photodetector, normalizing the digital voltage value, and incrementing an index number before re-exposing the photodetector.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principals of the invention. Moreover, in the figures, like reference numerals designate corresponding parts throughout the different views.

DETAILED DESCRIPTION OF THE PREFERRED EMBODIMENTS

Figure 1:
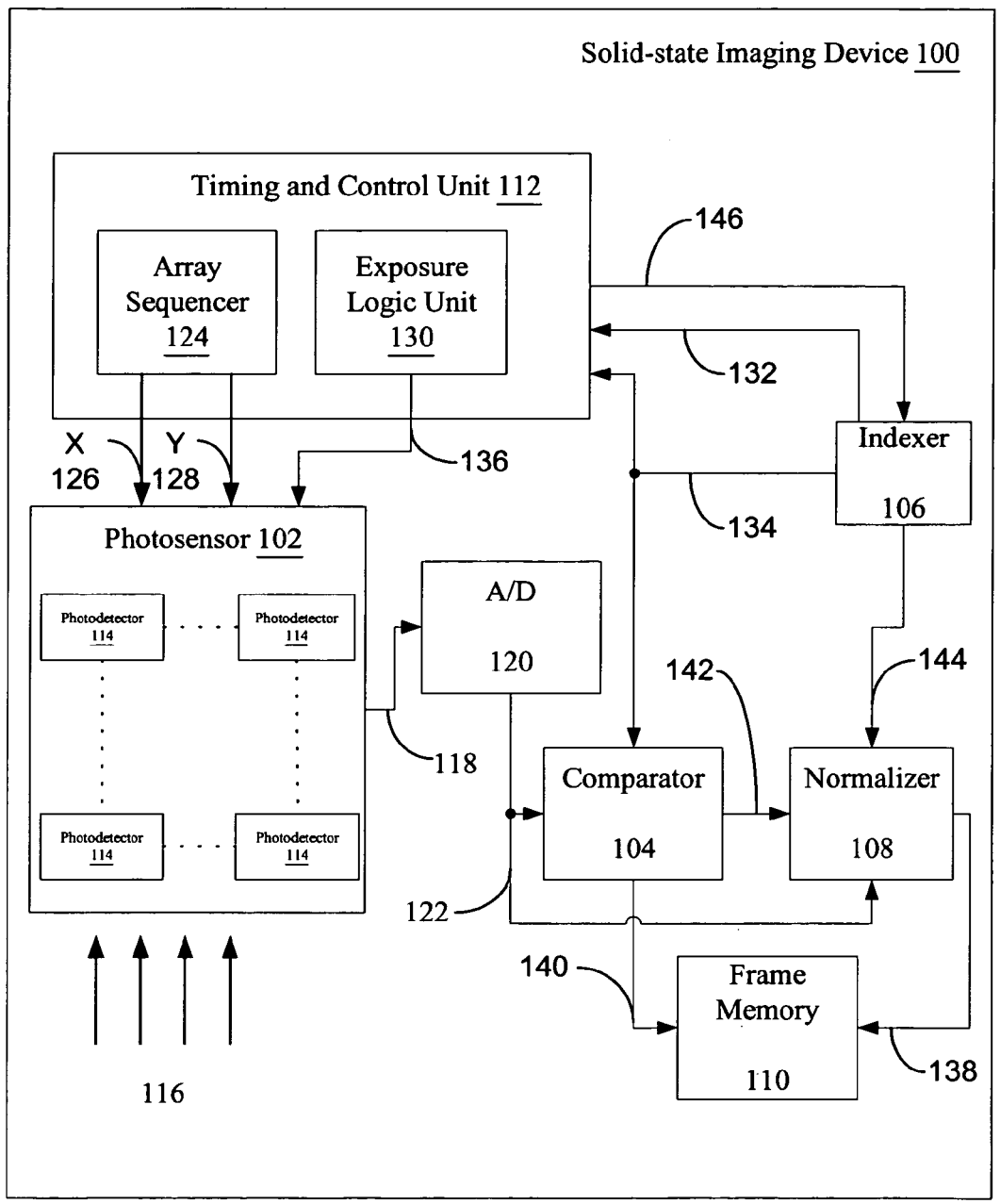
FIG. 1 is a block diagram illustrating an example implementation of a solid-state imaging device in accordance with the invention.

FIG. 1 illustrates a block diagram of an example implementation of solid-state imaging device 100 in accordance with the invention. The solid-state imaging device 100 includes a photosensor 102, a comparator 104, an indexer 106, a normalizer 108, a frame memory 110, and a timing and control unit 112. For illustration purposes, the photosensor 102 includes a two-dimensional array of photosensitive picture elements ("pixels"), or photodetectors 114. However, it is appreciated by one of ordinary skill in the art that any plurality of photodetectors 114 would satisfy the scope of the invention whether arranged in a one, two or multi-dimensional array topology. Additionally, it is also appreciated that the photosensor 102 may be a complementary metal oxide semiconductor (CMOS) device, charge injection device (CID), charge coupled device (CCD), or other equivalent imaging device. Furthermore, the photodetectors 114 may be active pixel sensor (APS) cell type or passive pixel sensor PPS cell type. All of the photodetectors 114 in the photosensor 102 are substantially similar as the result of the fabrication process utilizing a similar design in the die.

The photodetectors 114, in the photosensor 112, receive incident photon radiation 116 incident on the solid-state imaging device 100 and generate free charge carriers (i.e., electron-hole pairs in an amount proportional to the incident photon radiation 116. The photodetectors 114 receive the incident photon radiation 116, collect photo-charges (referred to as the collected charge) corresponding to the incident photon radiation 116 intensity and convert the collected photo-charges to an output analog signal (analog charge signal) representative of the level of energy reflected from a respective portion of the object.

The photodetectors 114 are capable of non-destructive read-out of the value of collected charge in each photodetector 114. The non-destructive read-out of the collected charge in each photodetector 114 results in a charge signal 118 corresponding to the collected charge. An analog-to-digital converter "A/D" 120 for converting the charge signal 118 to a digital voltage signal 122 may be built into each photodetector 114, located off the photodetectors 114 (in another part of the die of the solid-state device 100) or located off the solid-state device 100 on a separate device. Alternatively, a separate A/D (not shown) may be included for utilization by all of the photodetectors 114. In either case, the A/D 120 converts the charge signal 118 corresponding to the collected charge from each photodetector 114 to a digital signal (the digital voltage signal 122).

The timing control unit 112 includes an array sequencer 124 with X-Y location outputs 126 and 128 (corresponding to the location of the current photodetector 114) so that each photodetector 114 in the photosensor 102 may be read-out in turn. At each clock pulse, the X-Y location outputs 126 and 128 identify the next photodetector 114, and the collected charge is non-destructively read out. The timing control unit 112 also includes an exposure logic unit 130 that controls the exposures of the photosensor 102. The exposure logic unit 130 receives an index value N 132, and the maximum index signal 134 from the indexer 106. Based on these received signals (132 and 134), the exposure logic unit 130 outputs a exposure control output 136, which controls an exposure shutter (not shown). The exposure shutter may be, for example, a mechanical, electrical or electromagnetic shutter. The solid-state imaging device 100 is capable of multiple, cumulative exposures where each of the exposures may be for different lengths of time, as determined by the exposure logic unit 130.

The frame memory 110 stores a normalized voltage value 138 corresponding to each photodetector 114. The frame memory 110 has a storage location corresponding to each photodetector 114 in the photosensor 102. The frame memory 110 may be a random access memory (RAM), read only memory (ROM), non-volatile memory such as flash memory or flash sticks, electrically erasable programmable read only memory (EEPROM), or other equivalent memory devices.

The comparator 104 compares the digital voltage signal 122 corresponding to the stored charge in each photodetector 114 to a predetermined voltage value. The predetermined voltage value is the value corresponding to approximately fifty percent of the maximum charge storage capability of the photodetectors 114. After comparison, the comparator 104 determines whether the storage location in the frame memory 110 (which corresponds to that particular photodetector 114) is blank. A "blank" storage location means that a value of approximately zero is stored in that location. It is appreciated by those skilled in the art that the value of "zero" may actually be slightly greater than zero as a result of noise. The comparator 104 receives information from the frame memory 110 via a data bus 140 between the frame memory 110 and the comparator 104. The comparator 104 may be a standard hardwired comparison logic unit or it may be incorporated into a software controlled microprocessor.

The comparator 104 generates a comparison output 142 based on the comparison of the digital voltage signal 122 to the predetermined voltage value, and sends this comparison output 142 to a normalizer 108. The normalizer 108 receives both the comparison output 142 from the comparator 104, as well as an index value 144 from the indexer 106. The normalizer 108 is typically a standard hardwired programmable shifter such as, for example, a barrel shifter. However, it is appreciated that the function of the normalizer 108 may be accomplished by a software controlled microprocessor.

The indexer 106 is an incrementing circuit which increments the index value N at the end of each scan of the photosensor 102 by the array sequencer 124 that communicates with the indexer 106 via the timing and control unit 112 through via signal 146. The index value is equal to the number of iterations that have occurred. An iteration includes an exposure and a full scan of the photosensor 102. Thus, for example, after the base exposure and the first scan (i.e., readout) of the photosensor 102, the indexer 106 adds "1" to "0," indicating that one iteration has taken place.

In general, when the comparator 104 determines that (1) the charge stored in a particular photodetector 114 in the photosensor 102 is greater than fifty percent of the maximum charge storage capability of the photodetector 114, and (2) the storage location in the frame memory 110 corresponding to the particular photodetector 114 is blank, then the normalizer 108 receives the comparison output 142 from the comparator 104, instructing the normalizer 108 to shift the digital voltage signal 122 by N bits. Upon receiving the shift instruction via the comparison output 142, the normalizer 108 shifts the digital voltage signal 122 corresponding to that particular photodetector 114 to the right by a number of bits equal to N, where N is equal to the current index number as indicated by the index output 144. The index output 144 is determined by the indexer 106, which may be a standard hardwired incrementing logic circuit or incorporated into a software controlled microprocessor. The indexer 106 increments the index value by one after the array sequencer 124 completes a full scan of the photosensor 102.

If the comparator 104 determines that either the charge stored in a photodetector 114 in the photosensor 102 is not greater than fifty percent of the maximum charge storage capability of the photodetector 114, or the storage location in the frame memory 110 corresponding to the particular photodetector 114 is not blank, the normalizer 108 receives the comparison output 142 from the comparator 104, instructing the normalizer 108 not to shift the digital voltage signal 122. After receiving a "no-shift" instruction via the comparison output 142, the normalizer 108 ignores the corresponding digital voltage signal 122, and nothing is stored in the frame memory 110.

Figure 2:
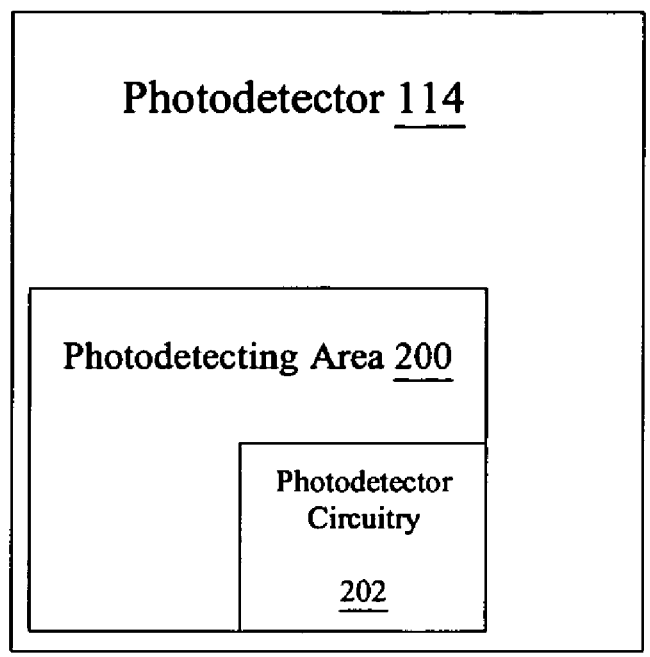
FIG. 2 is a diagram illustrating a photodetector in the photosensor of FIG. 1.
Figure 2:
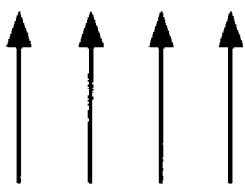

In FIG. 2, a photodetector 114, FIG. 1, is shown. The photodetector 114 includes a detecting area 200, FIG. 2, (also known as the photosensitive area or the detector area) and photodetector circuitry 202. The detecting area 200 is the portion of the photodetector 114 that receives photon radiation 116 incident upon the solid-state imaging device 100, FIG. 1, and converts the received photon radiation 116 into photo-charges via free charge carriers. The photodetector circuitry 202 converts the photo-charges into an output analog signal (analog charge signal) or potential representative of the level of energy reflected from a respective portion of an object. The photodetector circuity 202 may also include active circuitry such as a transistor and an A/D converter.

Figure 3:
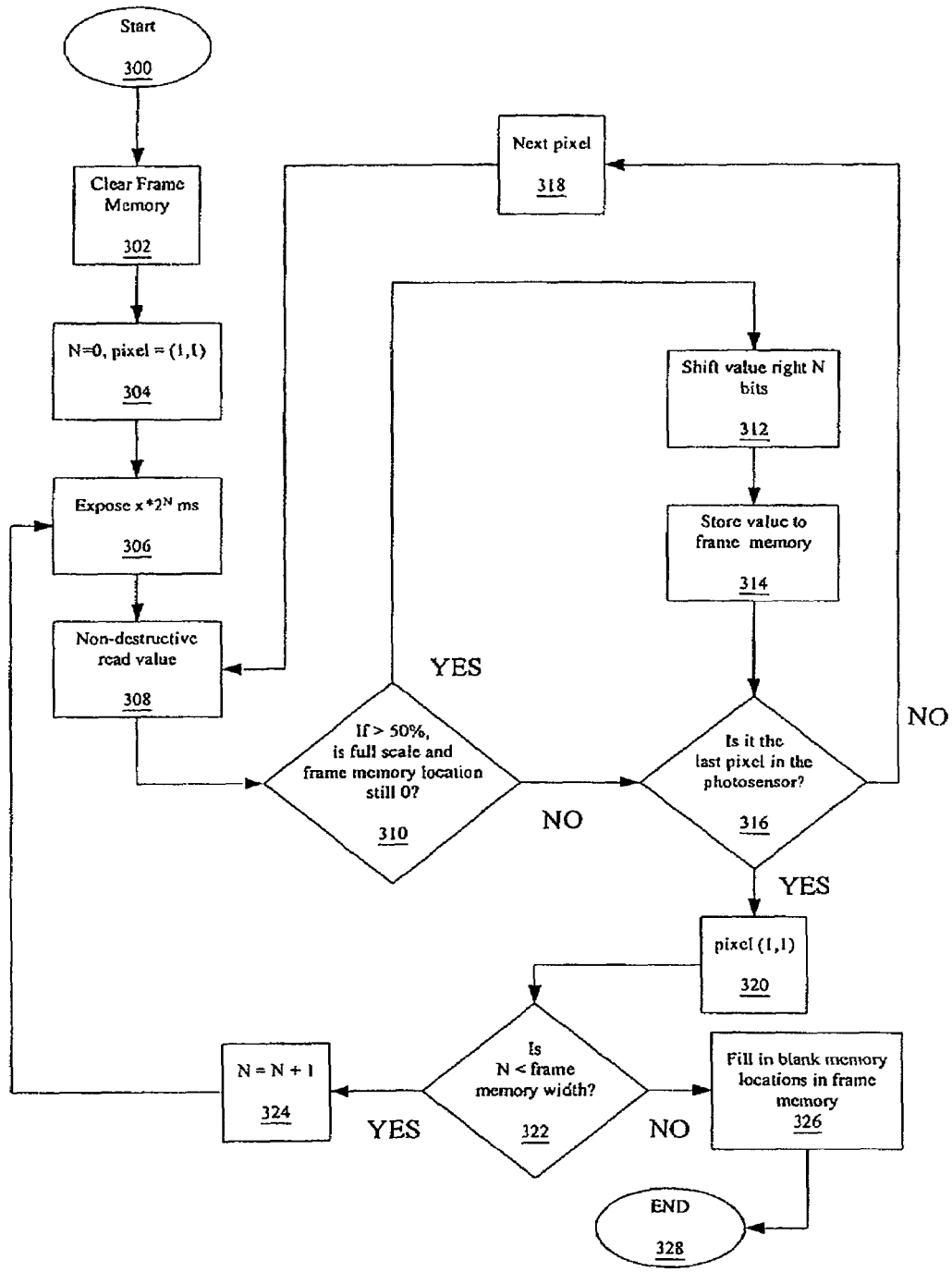
FIG. 3 is a flow chart illustrating the process performed by the solid-state imaging device of FIG. 1 in generating digital images with improved dynamic range.

FIG. 3 illustrates an example process performed by the solid-state imaging device 100 in FIG. 1. The process begins in step 300, FIG. 3, by initializing the solid-state imaging device 100, FIG. 1, in steps 302, FIG. 3, and 304. The initialization steps 302 and 304 include clearing the frame memory in step 302, and resetting the index value, and the current X-Y location outputs 126, FIG. 1, and 128 in step 304, FIG. 3. Clearing the frame memory in step 302 includes resetting all of the frame memory locations to approximately zero values. Similarly, resetting the index value and X-Y location outputs 126, FIG. 1, and 128 in step 304, FIG. 3, includes setting the index value to zero, and setting the X-Y location output 126, FIG. 1, and 128 to the first photodetector 114 (i.e., pixel) in the photosensor 102 (e.g., (1,1)). The initialization steps 302 and 304 is performed upon a triggering event such as, for example, pressing a "start exposure" button.

Next, the photosensor 102 is initially exposed with incident photon radiation 116, FIG. 1, (referred to as the base exposure) for a certain amount of time in step 306, FIG. 3. The length of time for the base exposure (referred to as the base exposure period) is a predetermined amount of time. An example for the base exposure period is 10 mS. After the base exposure, the charge collected in each photodetector 114 is, in turn, non-destructively read out, step 308, and a corresponding digital voltage signal 122, FIG. 1, is compared, in comparator 104, to a predetermined voltage value in decision step 310, FIG. 3. If appropriate, the digital voltage signal 122, FIG. 1, is shifted and stored in the frame memory 110 in steps 308, FIG. 3, through 320.

For the non-destructive readout step 308, the timing control unit 112, FIG. 1, sequences through the photosensor 102 pixel by pixel (i.e., photodetector 114 by photodetector 114). Beginning with the first photodetector 114, (e.g., (1,1)), after the base exposure, each photodetector 114 is in turn be non-destructively read out in step 308, FIG. 3. The non-destructive (as opposed to destructive) read-out preserves the collected charge in the photodetector 114, FIG. 1, so that subsequent exposures will result in a cumulative collection of charge. The non-destructive read-out includes an A/D conversion step (not shown). Each photodetector 114 may include an embedded A/D 120 for converting the charge signal 118 to a digital voltage signal 122 or the A/D 120 may be located off the photodetectors 114 (in another part of the die of the solid-state device 100) or located off the solid-state device 100 on a separate device. Alternatively, a separate A/D (not shown) may be included for utilization by all of the photodetectors 114. In either case, the A/D 120 converts the charge signal 118 corresponding to the collected charge from each photodetector 114 to the digital voltage signal 122. The digital voltage signal 122 corresponding to the amount of charge collected in the photodetector 114 is sent to the comparator 104 for comparison in step 310, FIG. 3.

During the decision step 310, the comparator 104, FIG. 1, determines whether the digital voltage signal 122 corresponding to the amount of charge collected in the photodetector 114 currently being analyzed or read-out ("$V_{pixel}$"), is greater than a predetermined voltage value ("$V_{pre}$"), and whether the frame memory 110 storage location corresponding to the photodetector 114 currently being analyzed or read-out is blank. As an example, the photodetector 114 currently being analyzed or read-out is referred to as the current pixel. If both of these conditions are satisfied (i.e., $V_{pixel} > V_{pre}$; and the memory location corresponding to the current pixel is blank), then, the normalizer 108 normalizes the digital voltage signal 122, and outputs a normalized voltage value 138 to the frame memory 110 in step 312, FIG. 3.

In step 312, if the normalizer 108, FIG. 1, is a shifter, the normalizer 108 shifts the digital voltage signal 122, $V_{pixel}$, to the right by N bits, where "N" is the current index value. As an example, typically during the base exposure N=0. Thus, the digital voltage signal 122 corresponding to any photodetectors 114 which meet both conditions (i.e., $V_{pixel} > V_{pre}$; and the memory location corresponding to the current pixel is blank) after the base exposure, will be shifted zero bits by the normalizer 108.

The normalized voltage value 138 is then stored in a corresponding location in the frame memory 110 in step 314, FIG. 3. Once the digital voltage signal 122, FIG. 1, for the current pixel is stored in the frame memory 110 in step 314, FIG. 3, the X-Y location outputs 126, FIG. 1, and 128 of the timing control unit 112 proceed to the next photodetector 114 in the photosensor 102, in step 318, FIG. 3. As an example, if the previously read photodetector 114, FIG. 1, was at (3,5), the X-Y location outputs 126 and 128 may proceed to the photodetector 114 at (3,6). However, if the previously read photodetector 114 was the last one in the photosensor 102 (i.e., (m, n) in a photosensor 102 with "m" columns and "n" rows) in step 316, FIG. 3, then a full iteration has been completed. The indexer 106, FIG. 1, receives a signal indicating that the scanning of the photosensor 102 by the timing control unit 112 has started over (i.e., the X-Y location outputs 126 and 128 have returned back to (1,1)) in step 320, FIG. 3.

The solid-state imaging device 100, FIG. 1, next determines whether the current index value "N" is less than the frame memory width "W" in step 322, FIG. 3. The frame width W is the number of bits in each memory location of the frame memory 110. The indexer 106 compares the current index value N with the frame memory 110 width W to determine whether the current index value N is less than the frame memory 110 width W. The indexer 106 then sends the current index value N, via signal 132, to the timing control unit 112 and the "maximum index" signal 134 to the comparator 104. If the maximum index signal 134 indicates that the current index value N (signal 132) is not less than the frame memory 110 width W, then no additional exposures take place, and all of the blank memory locations in frame memory 110 are filled in step 326, FIG. 3. The process then ends in step 328. It is appreciated that the current index value N may be also compared to a predetermined value other than the frame memory 100, FIG. 1, width without effecting the spirit of the invention.

If the current index value N 132 is less than the frame memory width W, then the indexer 106 increments the index value N, which indicates a new iteration, and the index value is incremental in step 324, FIG. 3. The photosensor 102 is then exposed again in step 306. The new exposure is for a period of time so that the total exposure time is equal to $x*2^N$, where "x" is the base exposure period, and "N" is the index value (i.e., the number of iterations that have occurred). As an example, if N=0, the total exposure time is equal to "x".

As a result, the new net exposure will be equal to the total exposure time $(x*2^N)$ minus the total exposure time from the previous iteration. As an example, if "x," the base exposure time, is equal to 10 mS, the exposure times for each iteration are described in Table 1:

TABLE 1

| Iteration = Index = N | Total exposure = $x*2^N$ | New exposure = $(x*2^N)$ − (previous exposure) |
|---|---|---|
| 0 | 10 mS | (10 − 0) = 10 mS |
| 1 | 20 mS | (20 − 10) = 10 mS |
| 2 | 40 mS | (40 − 20) = 20 mS |
| 3 | 80 mS | (80 − 40) = 40 mS |
| 4 | 160 mS | (160 − 80) = 80 mS |
| 5 | 320 mS | (320 − 160) = 160 mS |
| 6 | 640 mS | (640 − 320) = 320 mS |

After the new exposure of step 306, steps 308, 310, 312 and 314 are repeated. That is, the photodetectors 114 are again non-destructively read-out in turn in step 308, the decision step 310 is repeated, and, if the comparison indicates it is appropriate, the digital voltage signals 122 are shifted and stored in steps 312 and 314. However, if, at the decision step 310 the comparator 104 determines that for the current pixel, either $V_{pixel}$ is not greater than $V_{pre}$ or the memory location corresponding to the current pixel is not blank, then the shifting and storage steps 312 and 314 are skipped for the current photodetector 114 during the current iteration, and the timing control unit 112 moves on to the next photodetector 114.

Figure 4:
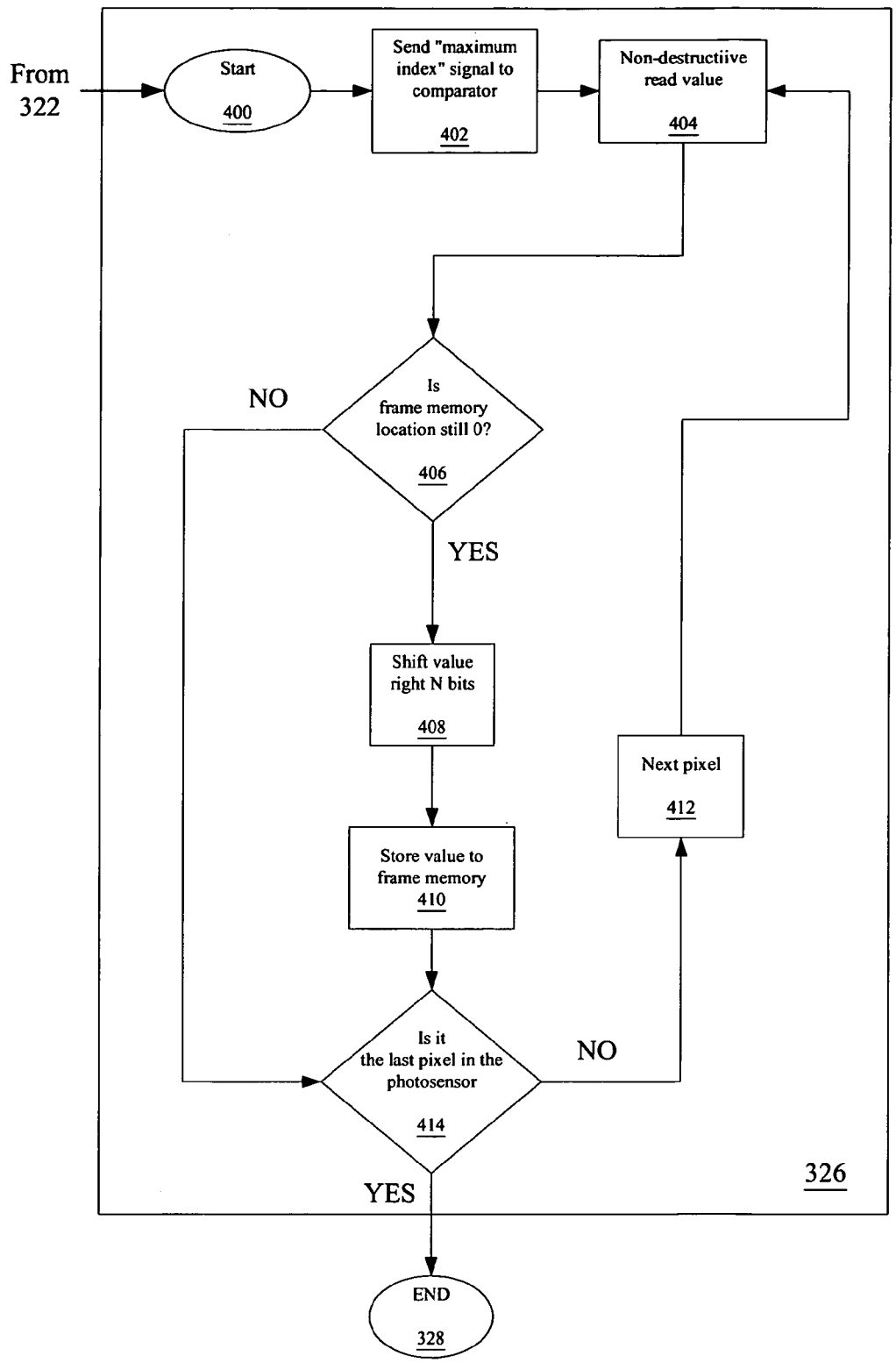
FIG. 4 is a flow chart illustrating the process of filling in blank memory locations in the frame memory when "N" is not less than the frame memory width, as shown in FIG. 3.

FIG. 4 is a flow chart illustrating the filling in of the blank memory locations in the frame memory when "N" is not less than the frame memory 110, FIG. 1, width, as described in step 326 of FIG. 3. The process begins in step 400. When the indexer 106, FIG. 1, determines that the current index value N is not less than the frame memory 110 width in step 322, FIG. 3, the indexer 106, FIG. 1, sends the "maximum index" signal 134 to the comparator 104 indicating that the current index value N is not less than the frame memory 100 width W in step 402, FIG. 4. This maximum index signal 134, FIG. 1, prevents any additional exposures from occurring, and overrides the comparison of $V_{pixel}$ and $V_{pre}$ by the comparator 104. As an example, this may be done by a switch ("fill-in switch") in the comparator 104 that, when switched on, always generates a comparison output 142 instructing the normalizer 108 to shift the digital voltage signal 122. Upon receiving the "maximum index" signal 134 from the indexer 106, the fill-in switch is switched on, and the comparator 104 sends the normalizer 108 a constant shift message, even if $V_{pixel}$ is less than $V_{pre}$.

Then, the first photodetector 114 is non-destructively read out in step 404, FIG. 4, and the comparator 104, FIG. 1, determines if the corresponding location in the frame memory 110 is blank in decision step 406, FIG. 4. If the location in the frame memory 110, FIG. 1, is blank, the normalizer 108 shifts the corresponding digital voltage signal 122 to the right by "N" bits in step 408, FIG. 4, and the normalized voltage value 138, FIG. 1, is stored in the appropriate location in the frame memory 110 in step 410, FIG. 4. Then, the timing control unit 112, FIG. 1, sequences to the next photodetector 114. If the frame memory 110 location is not blank, then the shifting and storing steps 408, FIG. 4, and 410 are skipped, and the timing control unit 112, FIG. 1, sequences to the next photodetector 114 in step 412, FIG. 4. The "filling in" process of step 326 continues throughout the photosensor 102, FIG. 1, until the photosensor 102 is completely scanned. When the photosensor 102 is completely scanned (i.e., the last photodetector 114 in the photosensor 102 has been reached, step 414, FIG. 4), the fill-in process is finished and the image generation is complete in step 328.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

What is claimed:

1. A system for generating digital images having improved dynamic range comprising:
    means for collecting a charge in a photodetector by exposing the photodetector with photons for a first predetermined period of time;
    means for comparing the charge to a predetermined value;
    means for normalizing a digital voltage value corresponding to the charge to generate a normalized voltage value if the charge is greater than or equal to the predetermined value;
    means for storing the normalized voltage value; and
    means for collecting additional charge in the photodetector by re-exposing the photodetector for a new period of time if the charge is less than the predetermined value.

2. The system of claim 1 further including means for non-destructively reading the charge.

3. The system of claim 1 wherein the means for storing further comprises means for storing the normalized voltage value in a location in a frame memory.

4. The system of claim 3 wherein the location in the frame memory is cleared before collecting the charge.

5. The system of claim 4 wherein the means for storing the normalized voltage value in the location in the frame memory stores the normalized voltage value in the location in the frame memory only if the location in the frame memory is blank.

6. The system of claim 1 further including means for incrementing an index number before collecting additional charge in the photodetector.

7. The system of claim 1 wherein the means for normalizing comprises means for shifting the digital voltage value to the right by a predetermined number of bits.

8. The system of claim 1 wherein the means for normalizing comprises means for shifting the digital voltage value to the right by a number of bits equal to the index number.

9. The system of claim 1 further including means for determining if the charge is less than the predetermined value, and if the index number is greater than a predetermined index value, prior to storing the normalized voltage value.

10. The system of claim 1 further including means for determining if the charge is less than the predetermined value, and if the index number is greater than a width of the location in the frame memory, prior to storing the normalized voltage value.

11. The system of claim 1 wherein the means for collecting additional charge comprises means for re-exposing the photodetector with photons for a period of time equal to $$x*2^{(N-1)}$$

where x is equal to the first predetermined period of time and N is equal to the index number.

12. A system for generating digital images having improved dynamic range comprising:
    a photodetector configured to collect a charge in by being exposed to photons for a first predetermined period of time;
    a comparator configured to compare the charge to a predetermined value;
    a normalizer configured to normalize a digital voltage value corresponding to the charge to generate a normalized voltage value if the charge is greater than or equal to the predetermined value;
    a memory configured to store the normalized voltage value; and
    wherein the photodetector collects additional charge by being re-exposed for a new period of time if the charge is less than the predetermined value.

13. The system of claim 12 further including a non-destructive charge reader.

14. The system of claim 12 wherein the memory is a location in a frame memory.

15. The system of claim 14 wherein the location in the frame memory is cleared before collecting the charge.

16. The system of claim 15 wherein the normalized voltage value is stored in the location in the frame memory only if the location in the frame memory is blank.

17. The system of claim 12, wherein an index number is incremented before collecting additional charge in the photodetector.

18. The system of claim 12 wherein the normalizer shifts the digital voltage value to the right by a predetermined number of bits.

19. The system of claim 12 wherein the normalizer shifts the digital voltage value to the right by a number of bits equal to the index number.

20. The system of claim 12, wherein prior to storing the normalized voltage value, the system determines if the charge is less than the predetermined value, and if the index number is greater than a predetermined index value.

21. The system of claim 12 wherein prior to storing the normalized voltage value, the system determines if the charge is less than the predetermined value, and if the index number is greater than a width of the location in the frame memory.

22. The system of claim 12 wherein the photodetector collects the additional charge by being re-exposed to photons for a period of time equal to $$x*2^{(N-1)}$$

where x is equal to the first predetermined period of time and N is equal to the index number.

23. A method of generating digital images having improved dynamic range comprising:
   collecting a charge in a photodetector by exposing the photodetector with photons for a first predetermined period of time;
   comparing the charge to a predetermined value;
   if the charge is greater than or equal to the predetermined value, normalizing a digital voltage value corresponding to the charge to generate a normalized voltage value and storing the normalized voltage value; and
   if the charge is less than the predetermined value, collecting additional charge in the photodetector by re-exposing the photodetector for a new period of time.

24. The method of claim 23 further including non-destructively reading the charge.

25. The method of claim 23 wherein the step of storing further comprises storing the normalized voltage value in a location in a frame memory.

26. The method of claim 25 further including clearing the location in the frame memory before collecting the charge.

27. The method of claim 26 wherein the step of storing the normalized voltage value in the location in the frame memory comprises storing the normalized voltage value in the location in the frame memory only if the location in the frame memory is blank.

28. The method of claim 23 further including incrementing an index number before collecting additional charge in the photodetector.

29. The method of claim 23 wherein the normalizing step comprises shifting the digital voltage value to the right by a predetermined number of bits.

30. The method of claim 23 wherein the normalizing step comprises shifting the digital voltage value to the right by a number of bits equal to the index number.

31. The method of claim 23 further including, prior to the step of storing the normalized voltage value, determining if the charge is less than the predetermined value, and if the index number is greater than a predetermined index value.

32. The method of claim 23 further including, prior to the step of storing the normalized voltage value, determining if the charge is less than the predetermined value, and if the index number is greater than a width of the location in the frame memory.

33. The method of claim 23 wherein the step of collecting additional charge comprises re-exposing the photodetector with photons for a period of time equal to $$X*2^{(N-1)}$$

where x is equal to the first predetermined period of time and N is equal to the index number.

* * * * *